United States Patent [19]

Pelet et al.

[11] Patent Number: 4,962,445

[45] Date of Patent: Oct. 9, 1990

[54] HOUSING FOR SUBMERSIBLE EQUIPMENT

[75] Inventors: André Pelet, Maurepas; Jacques Cachot, Saint Michel sur Orge, both of France

[73] Assignee: Societe anonyme dite: Alcatel Cit, Paris, France

[21] Appl. No.: 341,602

[22] Filed: Apr. 21, 1989

[30] Foreign Application Priority Data

Apr. 21, 1988 [FR] France ............................ 88 05297

[51] Int. Cl.$^5$ ............................................. H05K 7/20
[52] U.S. Cl. ..................................... 361/386; 165/80.3; 165/185; 174/16.3; 174/70.5; 357/79; 357/81; 361/389; 361/394; 361/399
[58] Field of Search .............................. 165/80.3, 185; 174/16.3, 70.5; 357/79, 81; 361/331, 380, 386–389, 392, 394, 395, 399

[56] References Cited

U.S. PATENT DOCUMENTS 4,679,250 7/1987 Davis et al. ..................... 174/70 S
4,757,157 7/1988 Pelet ................................ 174/70 S

FOREIGN PATENT DOCUMENTS 2139859 11/1984 United Kingdom .
2190794 11/1987 United Kingdom .

Primary Examiner—Gregory D. Thompson
Attorney, Agent, or Firm—Sughrue, Mion, Zinn, Macpeak & Seas

[57] ABSTRACT

The housing comprises a tubular vessel (1) which is rigid, heat-conducting, and closed in watertight manner at both ends, with electrical circuits being received in receptacles (2) which are rigid, heat-conducting, and pressed against the inside wall of the tubular vessel by annular split springs (8) disposed transversely between the receptacles which surround them and which press against them, and which by reaction are thrust toward the tubular vessel. Thin heat-conducting cushions (5) are inserted between the vessel and the receptacles. The receptacles are hinged on supports which bear against the spring, thereby enabling heat-generating circuits to be disposed in cavities (6) whose bottom lie close to the walls (3) via which the receptacles press against the tubular vessel. The invention is applicable, in particular, to repeater type equipment for undersea communications cables.

14 Claims, 4 Drawing Sheets

HOUSING FOR SUBMERSIBLE EQUIPMENT

The invention relates to housing for submersible equipment including electrical circuits which, in operation, give off heat that must be dissipated out from the housing. The invention relates more particularly to repeater housing for undersea communications cables.

BACKGROUND OF THE INVENTION

In order to be suitable for being immersed, sometimes at great depth, the circuits of such electrical equipment are enclosed in watertight housings designed to withstand high external pressure without major deformation; this applies in particular to the housings enclosing the electronic and/or electro-optical circuits of repeaters.

Electrically powered equipment generates heat in operation and this raises the temperature inside the housings. If a large amount of heat is produced in operation, it becomes necessary to provide heat dissipating means in order to avoid overheating the components of the equipment enclosed in the housing.

A housing provided with such means is described, for example, in United Kingdom patent number GB 2,139,859, and it comprises a rigid metal tubular vessel which is a good conductor of heat and which is arranged and dimensioned so as to be suitable for containing the circuits constituting a repeater internally.

The circuits are distributed therein in compartments in the form of 120° cylindrical sectors which build up to form a cylinder inside the tubular vessel. The inside diameter of the vessel is slightly larger than the diameter of the cylinder built up from the compartments, thereby leaving clearance for the deformation which may be caused by the pressure due to immersion.

The compartments are urged apart from one another by interposed springs, thereby urging them indirectly against the inside wall of the tubular vessel.

This arrangement suffers from the drawback of transmitting heat to the tubular vessel via areas of contact between the shaped surfaces of the compartments and of the vessel, which surfaces should fit one another accurately, whereas the vessel is liable to be deformed by the pressure of the fluid in which the housing is immersed, when immersed at depth.

This is made worse by the fact that the system of intermediate springs does not necessarily give rise to uniform distribution of clearance and can sometimes give rise to misalignments.

Further, in order to be accessible, the heat-producing circuits are mounted in cavities which open towards the outside of the cylinder delimited by the assembled compartments, thereby limiting the contact area between the compartments and the inside wall of the tubular vessel to zones situated around said cavities.

The invention therefore proposes a housing of the tubular type having a large cooling capacity, having little sensitivity to variations in pressure, which is simple in design and to assemble, and which is suitable for submersible equipment including electrical circuits that give off a large amount of heat in operation, which heat is dissipated to the outside via the tubular vessel of the housing.

SUMMARY OF THE INVENTION

The housing comprises a heat conducting rigid tubular vessel closed in watertight manner at its ends, and receptacles for receiving the electrical circuits, said receptacles being rigid and heat-conducting and being pressed against the inside wall of the tubular vessel by means of springs in such a manner as to allow the heat produced by the circuits to be dissipated out from the housing via the receptacles and the tubular vessel.

According to a characteristic of the invention, the housing includes springs of the split annular type, each being individually surrounded and compressed by all of the receptacles which are thereby urged by reaction against the inside wall of the tubular vessel.

BRIEF DESCRIPTION OF THE DRAWINGS

Embodiments of the invention are described by way of example with reference to the accompanying drawings, in which.

DETAILED DESCRIPTION

Figure 1:
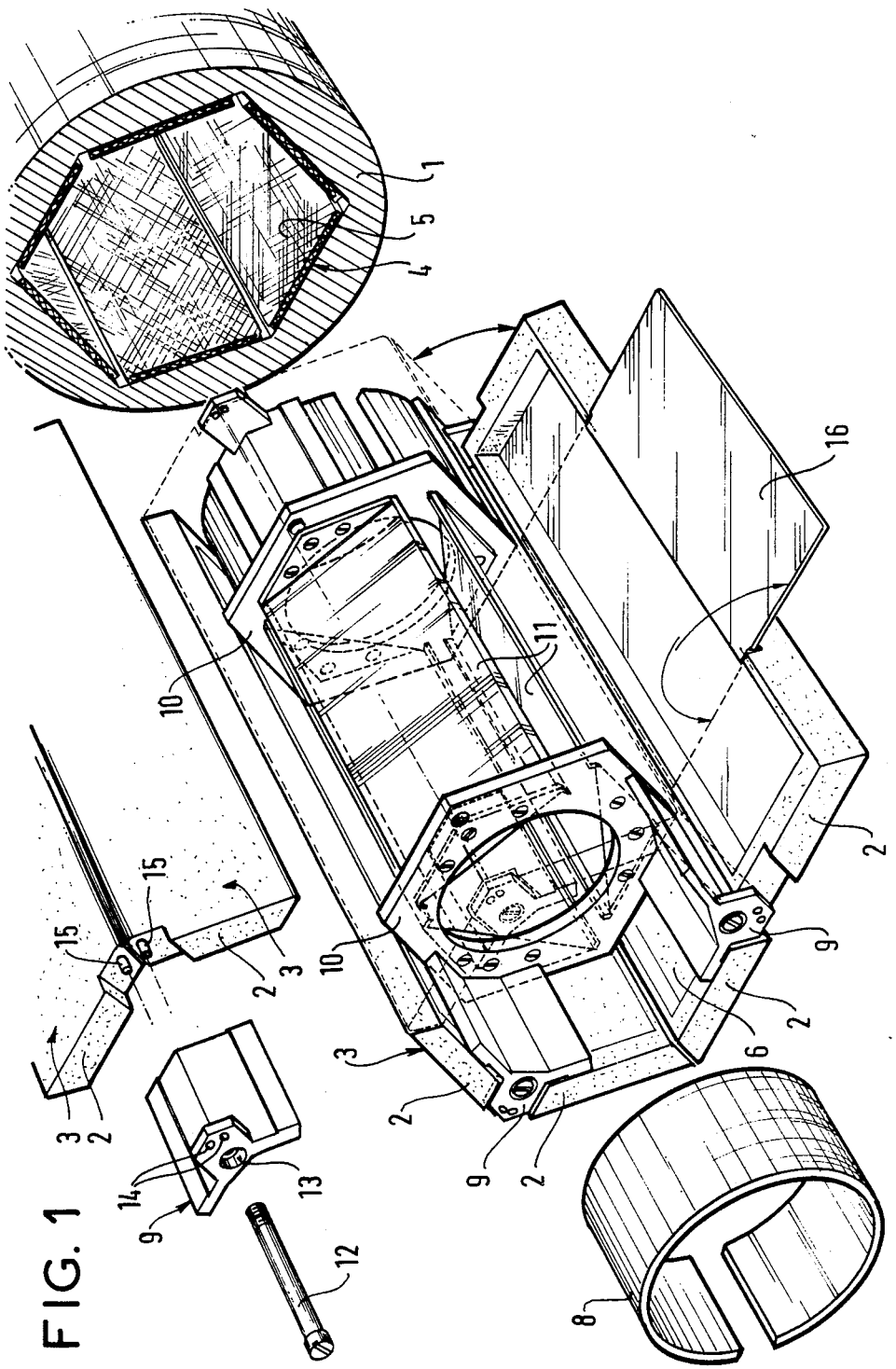
FIG. 1 is a fragmentary exploded view of a housing for submersible electrical equipment.
Figure 2:
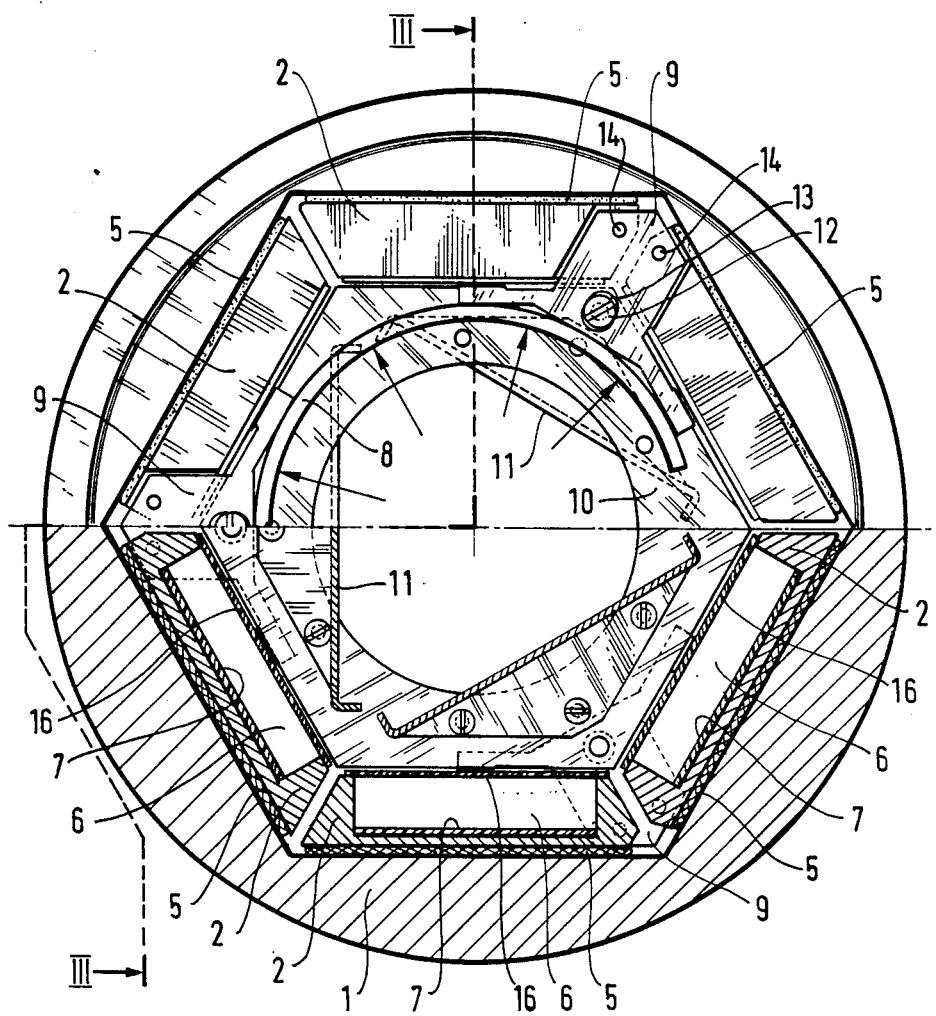
FIG. 2 is an end view in diametrical half-section of the FIG. 1 housing when assembled.
Figure 3:
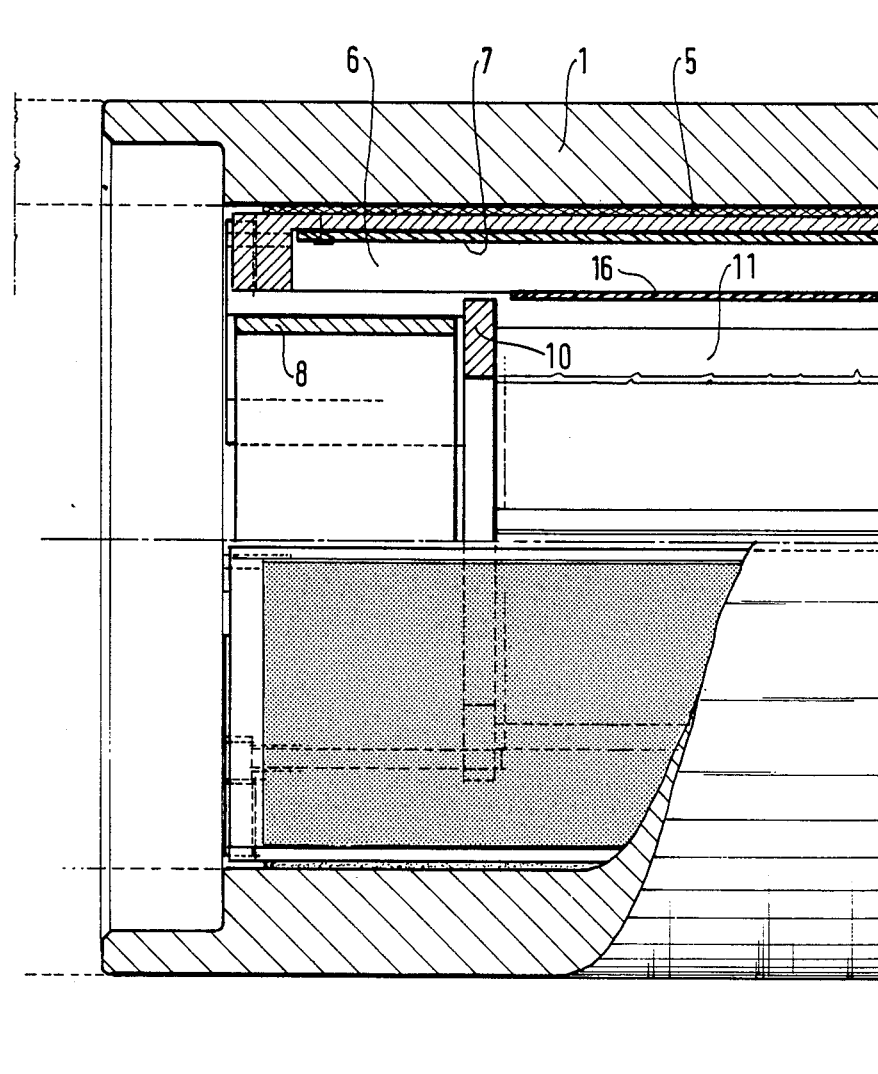
FIG. 3 is a fragmentary longitudinal section through the FIG. 1 housing, when assembled along the lines III—III of FIG. 2.

The housing shown in FIGS. 1 to 3 is intended to house submersible equipment including electrical circuits which heat sufficiently to require means to be provided for dissipating the heat towards the outside of the housing.

In a conventional application, the submersible equipment is a repeater for a submarine communications cable having electronic and/or electro-optical circuits which are housed in a tubular vessel 1. The vessel is designed to be closed at its ends in watertight manner via partitions provided with watertight feedthroughs for an undersea communications cable, with the partitions, the feedthroughs, and the cables being omitted from the drawings.

The tubular vessel 1 of cylindrical appearance is constituted by a rigid material which is a good conductor of heat, and it is dimensioned so as to deform little under the effect of the high external pressure to which it may be subjected if the housing including the vessel is immersed at depth.

The tubular vessel 1 is constituted, for example, by a steel tube of circular cross section and is optionally covered internally and/or externally in an electrical insulating layer, e.g. of polyethylene, enabling all or a portion of the contents of the tube to be insulated from the tube and/or enabling the tube and its contents to be insulated relative to the medium in which it is immersed.

The portion of the equipment to be housed inside the tubular vessel 1 and constituted in a repeater by a set of electronic and/or electro-optical circuits is distributed over the volume available inside said tubular vessel in conventional manner.

Circuits including components which give off a large amount of heat in operation are disposed close to the inside wall of the envelope.

To this end, circuits including components that give off a large amount of heat (not shown in order to avoid overcrowding the figures) are disposed in receptacles 2 made of a rigid material which is a good conductor of heat, the receptacles being shaped in such a manner as to come substantially into close contact with the inside wall of the tubular vessel. As shown in FIGS. 1 and 2, each of these receptacles 2 has a large plane outer surface 3 which is slightly smaller than the plane facette of the inside wall 4 of the tubular vessel 1 against which it is pressed. Similarly, each of the receptacles 2' of the variant shown in FIG. 4 has a large curved outer surface 3' which is complementary to a cylindrical inside wall sector of the tubular vessel against which it is pressed.

In a preferred embodiment, a thin metal cushion 5 or 5' is inserted between each large outer surface 3 or 3' of a receptacle 2 or 2' and the inside wall 4 or 4' of the tubular vessel 1 or 1' against which said large surface is pressed.

Each metal cushion 5 or 5' is constituted by a fine woven metal envelope surrounding a resilient metal knit, both being good conductors of heat.

The appearance of each of the receptacles 2 or 2' is at least roughly that of a rectangular parallelepiped, and each receptacle is made of a material which is a good conductor of heat and includes at least one circuit-receiving cavity 6 or 6' with the bottom of the cavity lying close to the large surface 3 or 3' of the receptacle, but on the inside thereof. In the embodiments shown, the cavities which are generally in the form of rectangular parallelepipeds occupy the major portions of the receptacles so as to be able to receive printed circuit cards of large dimensions.

In the embodiment shown in FIGS. 1 to 3, the bottom of the cavity 6 in each receptacle 2 extends parallel to the large plane outer surface 3 of the receptacle and close thereto so as to enable a printed circuit card to be positioned in the cavity parallel to the bottom and consequently close to the inside wall of the tubular vessel 1 against which the large plane outer surface 3 adjacent thereto is pressed. Electrical circuits which generate heat can thus be cooled highly effectively by placing them on cards such as 7 disposed on the bottoms of the cavities 6, thereby enabling the cards to transmit the heat produced to the tubular vessel 1 over the entire area of the large plane outer surface 3 of each receptacle, and through the metal cushion 5.

Figure 4:
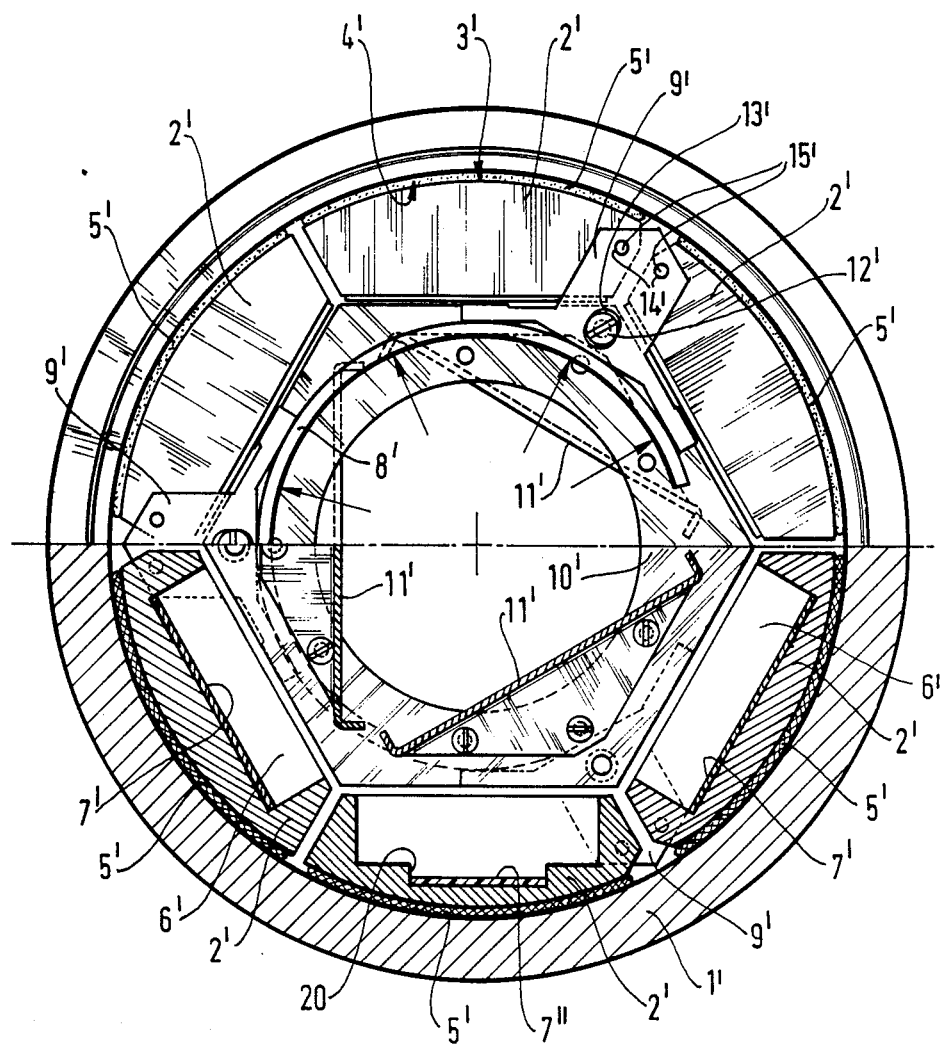
FIG. 4 is an end view in diametrical half-section of a variant of the housing.

Similarly, in the embodiment shown in FIG. 4, the bottom of the cavity in each receptacle 2 lies close to the large curved outer surface 3' of the receptacle, thereby also providing very good cooling for heat generating electrical circuits disposed on cards such as 7' or 7" received in the bottoms of the cavities.

It may be observed that the embodiment shown in FIG. 4 makes it possible to obtain cavities of greater depth for the same outside diameter of the tubular vessel, and thus makes it possible to house components of greater height, should that be necessary. Thus, FIG. 4 shows two different types of cavity bottom, one of them is intended to receive a circuit card such as 7' and is analogous to the cavities 6 shown in FIGS. 1 to 3, whereas the other is intended to receive a narrower circuit card such as 7", and then includes a step such as 20 making the cavity deeper.

In the embodiments shown in FIGS. 1 to 3 and in FIG. 4, maximum possible use can be made of the area of the inside wall of the tubular vessel 1 or 1' by a judicious selection of the number of receptacles and the size of the large outer surfaces 3 or 3' of said receptacles as a function of requirements.

In order to ensure good conduction of heat between the receptacles 2 or 2' and the tubular vessel 1 or 1' through the cushions 5 or 5', it is necessary to thrust the receptacles against the cushions and to thrust the cushions against the tubular vessel.

This is obtained by means of two annular springs 8 or 8' which are split transversely and which are compressed between supports 9 or 9' to which the receptacles 2 or 2' are fixed at the ends of the tubular vessel 1 or 1'.

Each annular spring is constituted by a wide strip of resilient material which is preferably insulating and which is looped so that it can be compressed by a set of centripetal forces so long as its transverse slot remains open. It is received between supports 9 or 9' which are uniformly spread around its periphery, such that each spring engages three supports disposed at 120° intervals around the spring in the examples shown.

The sides of each of the supports 9 or 9' for engaging the outside wall of a given annular spring are all fixed to a positioning plate 10 or 10' intended to be located transversely inside the tubular vessel 1 or 1' within the inside volume delimited by the receptacles 2 or 2'. The positioning plates 10 or 10' in a given vessel are fixed relative to each other by spacers 11 or 11'. There are two such plates in the embodiments shown, although a larger number of such plates could be provided in longer vessels which might otherwise be in danger of being squeezed centrally when immersed at great depth.

The spacers 11 or 11' fix together the plates 10 or 10' and thereby also fix together the supports 9 or 9' and the receptacles 2 or 2' so as to constitute an assembly capable of being inserted into or removed from the corresponding tubular vessel 1 or 1' in a single piece. The spacers 11 or 11' may optionally be used to support circuit components (not shown) which dissipate little or no heat in operation.

The supports 9 or 9' fixed to a common plate 10 or 10' at one end of the vessel for bearing against a common annular spring 8 or 8' are mounted in such a manner as to transmit the centripetal pressure exerted by the spring to the receptacles 2 or 2' once the spring has been put into place. To this end, each of these supports is provided with a small degree of freedom enabling it to move parallel to its plate, and consequently enabling it to move transversely inside the tubular vessel in which it has been placed.

In the embodiments shown, each receptacle 2 or 2' is mounted so as to be capable of rotating to some extent between two aligned supports 9 or 9' each fixed to a different corresponding plate 10 or 10' and holding said receptacle at one of its longitudinal ends.

The two supports associated with any given receptacle also serve a second receptacle associated adjacent to the first and running parallel thereto, lengthwise. The supports serve to position the two receptacles individually and/or jointly either in a folded-down position suitable for enabling the receptacles to be inserted into the tubular vessel 1 or 1' with their plane or curved large outer faces (depending on the embodiment) facing the inside wall of the tubular vessel, and an open position which can be reached only outside the tubular vessel in which the cavity 6 or 6' of the receptacle is directly accessible, as can be seen for the receptacle 2 shown at the bottom of FIG. 1.

In the embodiments shown, each support 9 or 9' is constituted by a ridge portion suitable for pressing against the outside wall of an annular spring via its inside walls and for acting as a bearing surface at the end of rotation for each of the two receptacles it carries, via one or other of its outside walls.

As can be seen in greater detail for one of the supports 9 at the top of FIG. 1, each support 9 or 9' is fixed to the plate by which it is carried by means of a bolt 12 or 12' passing along a duct 13 or 13' running parallel to the ridge line constituted by the support. The bolt 12 or 12' holds its support 9 or 9' axially in position between the projecting head of the bolt and the plate in which the bolt 12 or 12' is fixed longitudinally, e.g. by a screw thread.

Clearance is provided between each duct 13 or 13' and the corresponding bolt 12 or 12', thereby allowing the corresponding supports to move transversely relative to the bolt 12 or 12'. In one embodiment, the section of the duct is slightly oblong with its long axis lying in a plane containing the ridge of the support 9 or 9', thereby enabling the supports 9 or 9' to move radially relative to the axis of the tubular vessel 1 or 1' in which they are received.

The pairs of receptacles 2 or 2' are hinged on the support 9 or 9' by means of a hinge member constituted in this case by an end lug extending perpendicularly to the ridge of the support. The lug is situated on the outside of the ridge and at the end of the support furthest from the plate on which the support is mounted. Each end lug has two receptacle hinges disposed symmetrically about a radial midplane and constituted by two parallel holes 14 or 14' for receiving a corresponding end 15 or 15' of a hinge pin for the corresponding one of the two receptacles 2 or 2' carried by the support 9 or 9' under consideration.

Each receptacle 2 or 2' is mounted to rotate on two aligned supports 9 or 9' mounted on two different plates, with the two ends 15 or 15' of its hinge pin being received in corresponding aligned holes 14 or 14' of the supports.

In the embodiments shown, six receptacles 2 or 2' are mounted in three pairs on supports 9 or 9', with their plane or curved large outer faces 3 or 3' defining a hexagonal or a cylindrical solid suitable for penetrating into the corresponding tubular vessel 1 or 1' when the receptacles are in their folded-down positions with their inside faces bearing against the outside walls of the ridges formed by the supports 9 or 9'.

By folding the receptacles 2 or 2' outwardly when the assembly is removed from the tubular vessel, it is possible to gain access to the circuits disposed in their cavities, which would otherwise be inaccessible.

The plates 10 or 10', the spacers 11 or 11', the supports 9 or 9', and the receptacles 2 or 2' fitted with their circuits are held together as an assembly by simple mechanical assembly operations prior to being located inside the corresponding tubular vessel 1 or 1'. The assembly is merely inserted into the corresponding tubular vessel via one of its ends, with the receptacles being folded down into the positions they are to occupy inside the vessel.

The annular springs 8 or 8' are inserted between the support 9 or 9' via the ends of the tubular vessel after the above-mentioned assembly has been located therein, with such insertion requiring the springs to be compressed before they can be inserted. Once in place, the springs serve to urge the receptacles 2 or 2' against the cushions 5 or 5' and to urge the cushions against the inside wall of the tubular vessel 1 or 1' by virtue of the direct centripetal action of each of the springs against the support 9 or 9' between which it is located. The cushions 5 or 5' are naturally inserted into the tubular vessel prior to the springs, e.g. together with the above-specified assembly.

Any possible localized deformation of the tubular vessel when immerged in depth is essentially absorbed by the metal cushions, while the annular springs serve mainly to position the receptacles properly, and subsidiarily to avoid the rigid receptacles being deformed.

As mentioned above, the spacers 11 or 11' may be used as supports for circuits and/or components.

As shown in FIGS. 1 to 3, it is also possible to hinge an additional circuit support card 16 on at least one of the receptacles 2, with the embodiment shown in the figures including one such card on each receptacle 2. Each card 16 is fixed on a receptacle 2 near one of its edges so as to be capable of being folded in to cover at least a portion of the cavity 6 in the receptacle and of being folded out to give access to the entire cavity 6, when the receptacle is outside the tubular vessel 1. The necessary electrical and/or optical connections for the circuits on the plate 16 are provided by conventional means using flexible electrical and/or optical conductors (not shown).

Naturally, although not shown, an additional circuit card analogous to the card 16 could be hinged on at least one of the receptacles 2' in the embodiment shown in FIG. 4.

We claim:

1. A housing for submersible equipment including electrical circuits, the housing comprising a heat conducting rigid tubular vessel closed in watertight manner at its ends, and receptacles for receiving the electrical circuits, said receptacles being rigid and heat-conducting and being resiliently pressed forward toward the inside wall of the tubular vessel in such a manner as to allow the heat produced by the circuits to be dissipated out from the housing, wherein the housing includes annular springs of the split annular type each being under compression and individually surrounded by all the receptacles whereby, under expansion of the annular springs, the receptacles are thereby commonly urged by said annular springs in the direction of the inside wall of the tubular vessel.

2. A housing according to claim 1, further including a thin heat-conducting cushion inserted between each of said receptacles and a portion of the inside wall of the tubular vessel and each of said receptacles being urged against a respective thin cushion.

3. A housing according to claim 1, wherein the annular springs bear against the receptacles via ridge-shaped supports, each of said supports contacting the outside wall of one of the annular springs via an inside wall of said supports with an outside wall of each support bearing against at least one receptacle.

4. A housing according to claim 3, wherein the supports contact the outside wall of one of said annular springs and are mounted on a plate disposed transversely inside the tubular vessel, and surrounded by the receptacles, and located on the same end of the vessel as said one annular spring, with each support being mounted for limited transverse displacment relative to said plate, over which said support slides.

5. A housing according to claim 4, wherein each of said supports has a duct going therethrough, said duct running parallel to a ridge of each support and receiving a bolt, said bolt being fixed perpendicular to said plate so as to position each support on the periphery of said one annular spring at the same end as the plate, said duct being oblong in section with a long axis lying in the midplane passing through the ridge of each support enabling each support to move radially against the plate inside the tubular vessel, with said bolt preventing each support from moving axially relative to the plate.

6. A housing according to claim 3, wherein each of said supports is provided with a hinge member hinged to two side-by-side receptacles for hinging said receptacles between said each support and another identical support in alignment therewith and mounted on a corresponding other plate, said two receptacles being retained at one of their edges between the hinge members of the supports which carry them and each receptacle being capable of rotating from a folded-down position where it bears against one of the outside walls of the ridge of each of the two supports, which position is occupied inside the tubular vessel, and an open position which is accessible outside the tubular vessel and which gives access to the cavity receiving an electrical circuit, with the bottom of the cavity being adjacent to the wall of one of two said receptacles which bears against a thin heat conducting cushion carried by the inside wall of the tubular vessel.

7. A housing according to claim 6, wherein the assembly constituted by the receptacles mounted on their supports are fixed on two plates held together by means of spacers fixed between the plates and on sides thereof opposite to sides fixed to the supports, thereby enabling said assembly to be inserted as a unit into the tubular vessel and allowing the annular springs to be subsequently inserted, each via one end of the tubular vessel to engage a corresponding plate and to be disposed between the supports carried by a corresponding plate.

8. A housing according to claim 6, wherein at least one receptacle includes a circuit card hinged along one edge to one edge of said receptacle adjacent to said receptacle cavity, said circuit card at least partially covering the cavity when in a folded-down first position, and giving access to said cavity and to its own corresponding face when in an open, second position.

9. A housing according to claim 1, wherein each receptacle includes a plane bearing face pressing against a corresponding plane facette of the inside of the tubular vessel via a cushion.

10. A housing according to claim 1, wherein each receptacle has a curved bearing face pressing accurately against a curved inside wall portion of circular section in the tubular vessel via a cushion.

11. A housing for submersible equipment including electrical circuits, the housing comprising a heat conducting rigid tubular vessel closed in watertight manner at its ends, and receptacles for receiving the electrical circuits, said receptacles being rigid and heat-conducting and being resiliently pressed toward the inside wall of the tubular vessel by means of springs in such a manner as to allow the heat produced by the circuits to be dissipated out from the housing, wherein said springs are annular springs of the split annular type each being under compression and individually surrounded by all the receptacles whereby, under expansion of the annular springs, the receptacles are thereby urged commonly by said annular springs in the direction of the inside wall of the tubular vessel, and wherein the annular springs bear against the receptacles via ridge-shaped supports, each of said supports contacting the outside wall of one of the annular springs via an inside wall of each of said supports with an outside wall of each support bearing against at least one receptacle.

12. A housing according to claim 11, further including a thin heat-conducting cushion inserted, respectively between each of said receptacles and a portion of the inside wall of the tubular vessel and each of said receptacles being urged against a respective thin cushion.

13. A housing according to claim 11, wherein each receptacle includes a plane bearing face pressing against a corresponding plane facette of the inside of the tubular vessel via a cushion.

14. A housing according to claim 11, wherein each receptacle has a curved bearing face pressing arcuately against a curved inside wall portion of a circular section in the tubular vessel via a cushion.

* * * * *